United States Patent [19]

Birkin

[11] 3,781,792

[45] Dec. 25, 1973

[54] ERROR DETECTION IN COMMUNICATION SYSTEM BY REPETITION OF DATA

[75] Inventor: Michael S. Birkin, Derby, England

[73] Assignee: British Railways Board, London, England

[22] Filed: Jan. 3, 1972

[21] Appl. No.: 214,889

[52] U.S. Cl. ........................................ 340/146.1 BA
[51] Int. Cl. ........................ G06f 11/00, G08c 25/00
[58] Field of Search ............... 340/146.1, 146.1 BA, 340/146.1 C, 146.1 E; 235/153 AH

[56] References Cited

UNITED STATES PATENTS

| | | | |
|---|---|---|---|
| 2,512,038 | 6/1950 | Potts | 340/146.1 BA |
| 2,989,729 | 6/1961 | Schafer | 340/146.1 BA |
| 2,997,540 | 8/1961 | Ertman et al. | 340/146.1 BA |
| 3,105,955 | 10/1963 | Mauchly | 340/146.1 BA |
| 3,344,353 | 9/1967 | Wilcox | 340/146.1 BA |
| 3,523,279 | 8/1970 | Briley et al. | 340/146.1 BA |
| 3,551,885 | 12/1970 | Henzel | 340/146.1 BA |
| 3,624,603 | 11/1971 | Delcomyn | 340/146.1 BA |

*Primary Examiner*—Charles E. Atkinson
*Attorney*—Elliott I. Pollock et al.

[57] ABSTRACT

This invention relates to a communication system in which information is transmitted in the form of a continuously repeated digital sequence referred to as a 'message.' Each message is initially entered into a first register including a shift register whose outputs are energized in accordance with the digital sequence in the message, and each connected to one input of a bistable device. On reception of a second message in the sequence, the first message is passed to a second register, after an appropriate time delay, and the corresponding outputs of the second register are each connected to the second input of the corresponding bistable devices. Only if each message in the sequence is identical and both registers are operating correctly will the bistables receive input pulses from each of the registers alternately to give what is effectively an alternating voltage output.

6 Claims, 1 Drawing Figure

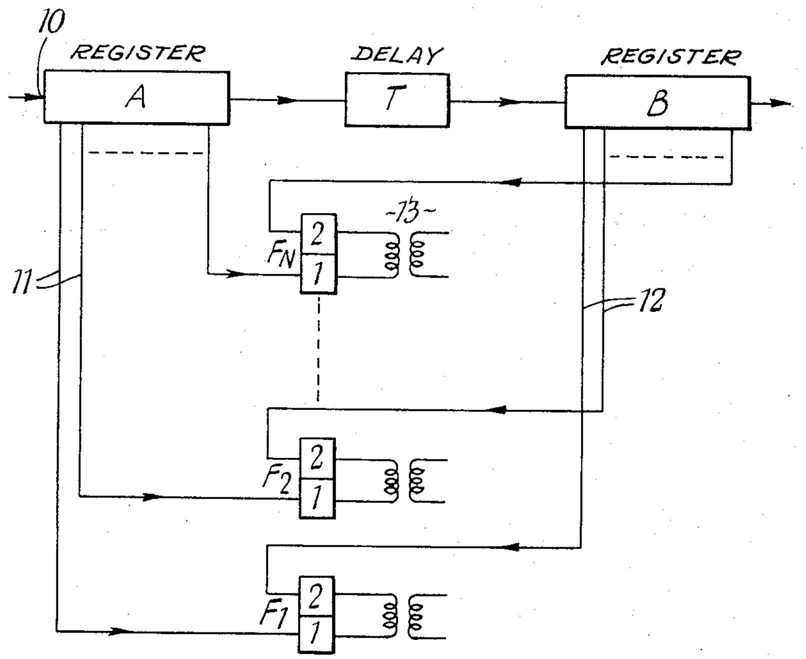
10
REGISTER
A
DELAY
T
REGISTER
B
-13-
2
$F_N$
1
11
12
2
$F_2$
1
2
$F_1$
1

ERROR DETECTION IN COMMUNICATION SYSTEM BY REPETITION OF DATA

The present invention relates to a communication system in which a signal receiver is arranged to receive a continuously repeated digital signal 'message' and to operate output devices only if successively received messages are identical. In this way any errors which may occur in the transmission of the message, cannot, unless repeated identically in successive messages, cause any of the output devices to operate.

It is to be understood that the term message used in this specification refers to a digital sequence representing a message in coded form.

The invention is particularly, but not exclusively, applicable to track-to-train communication systems in which information is passed from the track to the train, and/or from the train to the track.

In track-to-train communication systems, information in the form of a digital message is conveyed for example from a track-side transmitter to a train in order to control the running of the train by giving command signals to the train driver or by automatically actuating the train control gear. The information may be relayed from the transmitter through conductors laid along the track and which become inductively coupled with aerial means on the train, the aerial means in turn feeding receiving equipment on the train. The track message may have for example an information content which is used by equipment on the train for presentation to the train driver as a visual display.

According to the present invention, there is provided a communication system in which information is conveyed in digital code in the form of a repeatedly transmitted digital message and including a receiver comprising a first register arranged to receive a series of coded digital input signal messages, the register having one or more outputs each connected to an input of a bistable device, the said outputs being energized in correspondence with information contained in said message, a second register arranged to receive the first message from said first register through a delay circuit on the reception by said first register of a second message in the said series, the corresponding outputs of said second register each being connected to the corresponding second input of said bistable devices, the output of said bistable devices being connected to the input of an output transformer.

A preferred embodiment of the invention will now be described with reference to the accompanying drawing which shows a block diagram of a signalling receiver circuit.

A sequence of digital pulses constituting the signal information, designated a 'message', is fed to input 10 of register A. The pulses are thereafter passed to a shift register unit comprising in known manner a series of flip-flops or other bistable arrangements, each stage, i.e., each flip-flop, having a respective output each connected to a different output line 11. depending upon the content of the message, the appropriate ones of these output lines 11 are energized.

Each of the lines 11 is connected as one of two inputs to a series of bistable devices $F_1$, $F_2$......$F_N$, the number N being equal to the number of lines 11. Energization of respective ones of these lines 11 causes appropriate ones of the bistable devices F to set themselves in position 1 which is the first of their bistable states. A further sequence of digital pulses at the input 10 displaces the existing information out of the register A into a delay network T and eventually, after an appropriate delay, into a second register B where they are checked for validity, decoded and the appropriate output lines 12 energized. Each of these lines 12 from the second register B is connected to a second input of each of the bistable $F_1$, $F_2$......$F_N$. Thus energization of the appropriate ones of these lines 12 causes the corresponding ones, the bistables $F_1$, $F_2$......$F_N$ to set itself in position 2 which is the other of their bistable states. This causes the previously set bistable device $F_N$ to set itself in position 2.

The delay network T can be of any known form, but one conveniently used in practice is in the form of a shift register comprising a plurality of serially connected flip-flops, but omitting the parallel outputs. The magnitude of the delay is dependent upon the number of flip-flops in the register as the pulses are passed from one flip-flop to the next at each clock pulse; the greater the number of flip-flops, the greater the number of clock pulses which occur for a single pulse to pass along the delay network.

It is arranged that there is a continuous sequence of these messages. This will then result in the appropriate bistables $F_1$, $F_2$.......$F_N$ receiving set and re-set pulses separated by the delay T. The bistable device is operated as a divide-by-two counter and the resulting alternating output is then fed via a transformer 13 to operate a lamp, relay or such other output device as may be required. If either or both of the registers A or B should malfunction, then the bistables $F_1$, $F_2$......$F_N$ will receive pulses from only one of the registers, and consequently the output from the bistable will not be in the form of an alternating voltage and will be blocked by the transformer 13. Similarly, if an error occurs in the transmission of the messages, such that successive telegrams are not identical, then the outputs from the bistables will not be an alternating voltage which again will be blocked by the transformer 13.

Clearly, a sequence of identical messages can produce alternating voltages by the respective transformers 13 only if the delay provided by unit T is not equal to an integral multiple of the repetition rate of message reception; otherwise, each bistable device $F_1$, $F_2$....$F_N$ would receive pulses concurrently on its two inputs from both registers A and B and would then, of course, not be operable between its opposite conditions which is required if an alternating voltage is to be generated by a corresponding transformer 13.

A further improvement in safety may be made by making a transformer 13 give a voltage step-up so that the device operated by the transformer 13 has a significantly higher operating voltage than the digital logic. Any failure therefore of the transformer 13 such as a short between the primary and secondary would not result in undersirable operation of the output device.

Further optimisation of the system may be made, if required, by arranging that the delay T is such that the output from each of the divide-by-two bistable circuits $F_1$, $F_2$.....$F_N$ is a square wave of 1;1 ratio.

The 'message' information can be transmitted to the device described above either via conductor cables or by radio transmission.

I claim:

1. Communication apparatus in which information is conveyed in the form of repeatedly transmitted digitally coded messages each comprising the same plurality of bits which normally occur in the same predetermined pattern on each of successive messages, and system including:

a receiver comprising a first register and a second register each comprising a plurality of stages for storing the respective bits of a message, a plurality of bistable devices each having a first input connected to a particular stage of said first register which stores a particular bit of a message and having a second input connected to the corresponding stage of said second register which stores said same particular bit of said message, delay means coupled between said first and second registers, and means responsive to the repeated alternation in state of each bistable device as it operates between its opposite states in response to each reception of a message for providing a distinctive signal, whereby any of said responsive means produced said distinctive signal only when the particular bit of said message is the same in successive messages.

2. The apparatus of claim 1 in said responsive means includes an output means which is transformer coupled to the respective bistable device.

3. The apparatus of claim 2 wherein said transformer is a voltage step-up transformer.

4. The apparatus of claim 1 wherein said delay means provides a delay time which is a non-integral multiple of the repetitive rate at which messages are received.

5. The apparatus of claim 1 wherein said delay means comprises a shift register.

6. The apparatus of claim 1 wherein each register comprises a shift register.

* * * * *

UNITED STATES PATENT OFFICE

CERTIFICATE OF CORRECTION

Patent No. 3,781,792 Dated December 25, 1973

Inventor(s) MICHAEL S. BIRKIN

It is certified that error appears in the above-identified patent and that said Letters Patent are hereby corrected as shown below:

Foreign Application Priority Data

January 12, 1971 Great Britain. . . . . . . . .1469/71

Signed and sealed this 6th day of July 1974.

(SEAL)
Attest:

McCOY M. GIBSON, JR.
Attesting Officer

C. MARSHALL DANN
Commissioner of Patents